(12) United States Patent
Garwood

(10) Patent No.: US 6,866,832 B2
(45) Date of Patent: Mar. 15, 2005

(54) METHOD AND APPARATUS FOR SANITIZING PERISHABLE GOODS IN ENCLOSED CONDUITS

(75) Inventor: Anthony J. M. Garwood, Mercer Island, WA (US)

(73) Assignee: SafeFresh Technologies, LLC, Mercer Island, WA (US)

( * ) Notice: Subject to any disclaimer, the term of this patent is extended or adjusted under 35 U.S.C. 154(b) by 128 days.

(21) Appl. No.: 10/027,929

(22) Filed: Dec. 20, 2001

(65) Prior Publication Data

US 2002/0122856 A1 Sep. 5, 2002

Related U.S. Application Data

(63) Continuation-in-part of application No. PCT/US01/45146, filed on Nov. 28, 2001, and a continuation-in-part of application No. 09/724,287, filed on Nov. 28, 2000, which is a continuation-in-part of application No. PCT/US00/29038, filed on Oct. 19, 2000, which is a continuation-in-part of application No. 09/550,399, filed on Apr. 14, 2000, now abandoned, and a continuation-in-part of application No. 09/392,074, filed on Sep. 8, 1999, now abandoned, which is a continuation-in-part of application No. 09/039,150, filed on Mar. 13, 1998, now abandoned.

(60) Provisional application No. 60/255,684, filed on Dec. 13, 2000, provisional application No. 60/286,688, filed on Apr. 26, 2001, provisional application No. 60/291,872, filed on May 17, 2001, provisional application No. 60/299,240, filed on Jun. 18, 2001, provisional application No. 60/312,176, filed on Aug. 13, 2001, provisional application No. 60/314,109, filed on Aug. 21, 2001, provisional application No. 60/323,629, filed on Sep. 19, 2001, provisional application No. 60/335,760, filed on Oct. 19, 2001, provisional application No. 60/129,595, filed on Apr. 15, 1999, provisional application No. 60/141,569, filed on Jun. 29, 1999, provisional application No. 60/144,400, filed on Jul. 16, 1999, provisional application No. 60/148,227, filed on Jul. 27, 1999, provisional application No. 60/149,938, filed on Aug. 19, 1999, provisional application No. 60/152,677, filed on Sep. 7, 1999, provisional application No. 60/154,068, filed on Sep. 14, 1999, provisional application No. 60/160,445, filed on Oct. 19, 1999, provisional application No. 60/175,372, filed on Jan. 10, 2000, and provisional application No. 60/040,556, filed on Mar. 13, 1997.

(51) Int. Cl.$^7$ .............................................. B01D 11/02
(52) U.S. Cl. ....................... 422/261; 422/268; 422/269; 422/273; 422/274; 422/275
(58) Field of Search ................................. 422/261, 268, 422/269, 273, 274–275, 292, 297, 300

(56) References Cited

U.S. PATENT DOCUMENTS 2,596,514 A  5/1952  Uehlein (List continued on next page.)

FOREIGN PATENT DOCUMENTS

EP  0 284 502 A1  9/1988

(List continued on next page.)

OTHER PUBLICATIONS

The Flavaloc System, Garwood Limited advertising brochure, 1986.

(List continued on next page.)

Primary Examiner—Krisanne Jastrzab
(74) Attorney, Agent, or Firm—Christensen O'Connor Johnson Kindness PLLC

(57) ABSTRACT

The invention is directed to a method and apparatus for sanitizing perishable goods by mixing the goods with sanitizing fluid for a suitable period of time followed by separating the fluid and substantially neutralizing any residual sanitizing agent left in the goods. In one instance, the sanitizing agent includes ozone and water, therefore separation of the ozonated water advantageously proceeds with a squeezing effect to more adequately remove the ozonated water from the goods.

14 Claims, 6 Drawing Sheets

U.S. PATENT DOCUMENTS

| | | |
|---|---|---|
| 3,067,015 A | 12/1962 | Lawdermilt |
| 3,366,309 A | 1/1968 | Scharre |
| 3,396,430 A | 8/1968 | Westcott |
| 3,481,100 A | 12/1969 | Bergstrom |
| 3,811,148 A * | 5/1974 | Martin .................. 15/3.14 |
| 3,851,080 A | 11/1974 | Lugg et al. |
| 3,930,040 A | 12/1975 | Woodruff |
| 4,114,348 A | 9/1978 | Mahaffy et al. |
| 4,171,164 A | 10/1979 | Groves et al. |
| 4,201,030 A | 5/1980 | Mahaffy et al. |
| 4,244,978 A | 1/1981 | Barta |
| 4,314,451 A | 2/1982 | Leeds et al. |
| 4,363,263 A | 12/1982 | Williams |
| 4,395,132 A * | 7/1983 | Wyffels .................. 366/147 |
| 4,476,686 A | 10/1984 | Madsen et al. |
| 4,552,600 A | 11/1985 | Laiewski et al. |
| 4,569,204 A | 2/1986 | Ott et al. |
| 4,576,278 A | 3/1986 | Laiewski et al. |
| 4,594,253 A | 6/1986 | Fradlin |
| 4,642,239 A | 2/1987 | Ferrar et al. |
| 4,685,274 A | 8/1987 | Garwood |
| 4,744,199 A | 5/1988 | Gannon |
| 4,798,324 A | 1/1989 | Gannon |
| 4,818,548 A | 4/1989 | Cheng |
| 4,840,271 A | 6/1989 | Garwood |
| 4,974,781 A * | 12/1990 | Placzek .................. 241/17 |
| 4,987,725 A | 1/1991 | Gill |
| 4,992,287 A | 2/1991 | Dreano |
| 5,025,611 A | 6/1991 | Garwood |
| 5,034,235 A | 7/1991 | Dunn et al. |
| 5,042,540 A | 8/1991 | Gorlich |
| 5,103,618 A | 4/1992 | Garwood |
| 5,115,624 A | 5/1992 | Garwood |
| 5,129,512 A | 7/1992 | Garwood |
| 5,155,974 A | 10/1992 | Garwood |
| 5,226,531 A | 7/1993 | Garwood |
| 5,306,466 A | 4/1994 | Goldsmith |
| 5,323,590 A | 6/1994 | Garwood |
| 5,326,538 A * | 7/1994 | Walker .................. 422/184.1 |
| 5,334,405 A | 8/1994 | Gorlich |
| 5,348,752 A | 9/1994 | Gorlich |
| 5,352,467 A | 10/1994 | Mitchell et al. |
| 5,393,547 A | 2/1995 | Balaban et al. |
| 5,419,101 A | 5/1995 | Gorlich et al. |
| 5,433,142 A | 7/1995 | Roth |
| 5,447,736 A | 9/1995 | Gorlich |
| 5,460,833 A | 10/1995 | Andrews et al. |
| 5,476,759 A | 12/1995 | Gorlich et al. |
| 5,478,990 A | 12/1995 | Montanari et al. |
| 5,481,852 A | 1/1996 | Mitchell |
| 5,514,392 A | 5/1996 | Garwood |
| 5,520,005 A | 5/1996 | Appolonia |
| 5,534,282 A | 7/1996 | Garwood |
| 5,547,694 A | 8/1996 | Perry et al. |
| 5,560,182 A | 10/1996 | Garwood |
| 5,569,331 A * | 10/1996 | Barber, III .................. 134/40 |
| 5,590,602 A | 1/1997 | Peck et al. |
| 5,591,496 A | 1/1997 | Anderson et al. |
| 5,595,349 A * | 1/1997 | Bergstrom et al. ............ 241/41 |
| 5,597,561 A | 1/1997 | Kross |
| 5,597,597 A | 1/1997 | Newman |
| 5,597,599 A | 1/1997 | Smith et al. |
| 5,620,654 A * | 4/1997 | Mosenson .................. 422/28 |
| 5,622,725 A | 4/1997 | Kross |
| 5,628,959 A | 5/1997 | Kross |
| 5,629,060 A | 5/1997 | Garwood |
| 5,651,977 A | 7/1997 | Kross |
| 5,655,708 A | 8/1997 | Gröne |
| 5,667,817 A | 9/1997 | Kross |
| 5,667,827 A | 9/1997 | Breen et al. |
| 5,667,829 A * | 9/1997 | Herlig .................. 426/238 |
| 5,668,634 A | 9/1997 | Newman |
| 5,676,736 A | 10/1997 | Crozel |
| 5,686,126 A | 11/1997 | Noel et al. |
| 5,693,354 A | 12/1997 | Spencer et al. |
| 5,698,250 A | 12/1997 | DelDuca et al. |
| 5,709,897 A | 1/1998 | Pearlstein |
| 5,720,915 A | 2/1998 | Joppen et al. |
| 5,730,311 A | 3/1998 | Curtis |
| 5,731,023 A | 3/1998 | Milani |
| 5,772,985 A | 6/1998 | Kemp et al. |
| 5,779,832 A | 7/1998 | Kocher |
| 5,816,488 A | 10/1998 | Moeder |
| 5,823,867 A | 10/1998 | Roth et al. |
| 5,833,894 A | 11/1998 | Lanzani et al. |
| RE36,064 E | 1/1999 | Davidson et al. |
| 5,865,293 A | 2/1999 | Napadow |
| 5,871,795 A | 2/1999 | Roth |
| 5,882,916 A | 3/1999 | Wiersma |
| 5,885,637 A | 3/1999 | Roth et al. |
| 5,885,640 A | 3/1999 | Andersson |
| 5,944,749 A | 8/1999 | Fenn |
| 5,948,457 A | 9/1999 | DelDuca et al. |
| 5,950,402 A | 9/1999 | Hoddinott |
| 5,994,706 A | 11/1999 | Allen et al. |
| 5,996,155 A | 12/1999 | Chao et al. |
| 6,010,727 A | 1/2000 | Rosenthal |
| 6,036,918 A | 3/2000 | Kowanko |
| 6,039,991 A | 3/2000 | Ruozi |
| 6,042,859 A | 3/2000 | Shaklai |
| 6,046,243 A | 4/2000 | Wellinghoff et al. |
| 6,054,161 A | 4/2000 | Palmer |
| 6,054,164 A | 4/2000 | Roth |
| 6,063,425 A | 5/2000 | Kross et al. |
| 6,066,348 A | 5/2000 | Yuan et al. |
| 6,085,930 A | 7/2000 | Curtis |
| 6,086,833 A | 7/2000 | Conners et al. |
| 6,096,350 A | 8/2000 | Kemp et al. |
| 6,120,731 A | 9/2000 | Kross et al. |
| 6,123,966 A | 9/2000 | Kross |
| 6,142,067 A | 11/2000 | Roth |
| 6,148,249 A | 11/2000 | Newman |
| 6,162,477 A | 12/2000 | Crisinel et al. |
| 6,167,709 B1 | 1/2001 | Caracciolo, Jr. et al. |
| 6,180,585 B1 | 1/2001 | Schalitz et al. |
| 6,183,807 B1 | 2/2001 | Gutzmann et al. |
| 6,194,012 B1 | 2/2001 | Palmer |
| 6,200,618 B1 | 3/2001 | Smith et al. |
| 6,210,730 B1 | 4/2001 | Mitchell |
| 6,224,930 B1 | 5/2001 | Inglis et al. |
| 6,270,829 B1 | 8/2001 | Shaklai |
| 6,285,030 B1 | 9/2001 | Williams et al. |
| 6,294,791 B1 | 9/2001 | Williams et al. |
| 6,328,909 B1 | 12/2001 | Kross et al. |
| 6,331,272 B1 | 12/2001 | Sims |
| 6,342,261 B1 | 1/2002 | Spencer |
| 6,349,526 B1 | 2/2002 | Newman |
| 6,379,728 B1 | 4/2002 | Roth |
| 6,387,426 B1 | 5/2002 | Roth |
| 6,389,838 B1 | 5/2002 | Roth |
| 6,406,728 B1 | 6/2002 | Roth |
| 6,430,467 B1 | 8/2002 | D'Amelio et al. |
| 6,434,950 B2 | 8/2002 | Newman et al. |
| 2001/0042841 A1 | 11/2001 | Lyons et al. |
| 2002/0001648 A1 | 1/2002 | Roth |
| 2002/0015777 A1 | 2/2002 | Roth |
| 2002/0017203 A1 | 2/2002 | Roth |
| 2002/0043050 A1 | 4/2002 | Costello et al. |
| 2002/0075754 A1 | 6/2002 | Huber et al. |
| 2002/0075755 A1 | 6/2002 | Huber et al. |
| 2002/0110624 A1 | 8/2002 | Roth |

| | | | |
|---|---|---|---|
| 2002/0150659 | A1 | 10/2002 | Roth |
| 2002/0162971 | A1 | 11/2002 | Koenck et al. |
| 2003/0017252 | A1 | 1/2003 | Roth |

FOREIGN PATENT DOCUMENTS

| | | |
|---|---|---|
| EP | 0 755 875 A1 | 1/1997 |
| EP | 0 820 029 A2 | 1/1998 |
| EP | 0 649 282 B1 | 9/1998 |
| EP | 0 820 029 A3 | 5/1999 |
| EP | 0 649 283 B1 | 2/2002 |
| FR | 2 290 153 | 6/1976 |
| FR | 2 744 920 A1 | 8/1997 |
| GB | 393935 | 6/1933 |
| GB | 484195 | 5/1938 |
| GB | 2 247 524 A | 3/1992 |
| GB | 2 285 126 A | 6/1995 |
| GB | 2 315 584 A | 2/1998 |
| WO | WO 91/03400 | 3/1991 |
| WO | WO 91/03407 | 3/1991 |
| WO | WO 91/10593 | 7/1991 |
| WO | WO 92/10939 | 7/1992 |
| WO | WO 93/17562 | 9/1993 |
| WO | WO 93/25082 | 12/1993 |
| WO | WO 94/00997 | 1/1994 |
| WO | WO 94/06689 | 3/1994 |
| WO | WO 94/24875 | 11/1994 |
| WO | WO 94/27868 | 12/1994 |
| WO | WO 95/10944 | 4/1995 |
| WO | WO 96/24470 | 8/1996 |
| WO | WO 99/12664 | 3/1999 |
| WO | WO 99/13741 | 3/1999 |
| WO | WO 01/11993 A1 | 2/2001 |

OTHER PUBLICATIONS

"Meat Processing's Missing Link," *Food Quality Magazine*, Oct. 1996.

"Measure for Measure," *The National Provisioner*, 1997.

"In–line Composition Analysis Using Guided Microwave Spectrometry," *Processing*, 1998.

1999 Food Processing Award to Guided Microwave Spectrometry, *Food Processing*, Oct. 1999.

Guided Microwave Spectrometry, Epsilon Industrial product information,1994.

"FSIS Directive 6700.1: Retained Water in Raw Meat and Poultry Products," U.S. Department of Agriculture Food Safety and Inspection Service, Nov. 27, 2002 (effective date: Jan. 9, 2003), 11 pages.

"Guidance for Beef Grinders and Suppliers of Boneless Beef and Trim Products," U.S. Department of Agriculture Food Safety and Inspection Service, Sep. 2002, 28 pages.

Jordan, S.L., et al., "Augmentation of Killing of *Escherichia coli* O157 by Combinations of Lactate, Ethanol, and Low–pH Conditions," *Applied and Environmental Microbiology* 65(3):1308–1311, Mar. 1999.

Rulis, A.M., "Agency Response Letter: GRAS Notice No. GRN 000083," U.S. Food and Drug Administration, Office of Food Additive Safety, Feb. 21, 2002, 3 pages.

*The Wiley Encyclopedia of Packaging Technology*, 2d ed., 1996, pp. 204–205, 650–655, 674–680.

* cited by examiner

DIRECTION OF FLOW

⟹ BONELESS BEEF
⟶ "CHLORINE DIOXIDE", CHILLED WATER
---⟶ "OZONATED" CHILLED WATER

DIRECTION OF FLOW

⇒ BONELESS BEEF
→ "CHLORINE DIOXIDE", CHILLED WATER
--→ "OZONATED" CHILLED WATER

METHOD AND APPARATUS FOR SANITIZING PERISHABLE GOODS IN ENCLOSED CONDUITS

CROSS-REFERENCES TO RELATED APPLICATIONS

This application is a continuation-in-part of Application No. PCT/US01/45146, filed Nov. 28, 2001, which claims the benefit of Provisional Application Nos. 60/255,684, filed Dec. 13, 2000; 60/286,688, filed Apr. 26, 2001; 60/291,872, filed May 17, 2001; 60/299,240, filed Jun. 18, 2001; 60/312,176, filed Aug. 13, 2001; 60/314,109, filed Aug. 21, 2001; 60/323,629, filed Sep. 19, 2001; and 60/335,760, filed Oct. 19, 2001, and is a continuation-in-part of pending application Ser. No. 09/724,287, filed Nov. 28, 2000, which is a continuation-in-part of Application No. PCT/US00/29038, filed Oct. 19, 2000, which is a continuation-in-part of application Ser. No. 09/550,399, filed Apr. 14, 2000, now abandoned, which claims the benefit of Provisional Application Nos. 60/129,595, filed Apr. 15, 1999; 60/141,569, filed Jun. 29, 1999; 60/144,400, filed Jul. 16, 1999; 60/148,227, filed Jul. 27, 1999; 60/149,938, filed Aug. 19, 1999; 60/152,677, filed Sep. 7, 1999; 60/154,068, filed Sep. 14, 1999; 60/160,445, filed Oct. 19, 1999; and 60/175,372, filed Jan. 10, 2000, and is a continuation-in-part of application Ser. No. 09/392,074, filed Sep. 8, 1999, now abandoned, which is a continuation of application Ser. No. 09/039,150, filed Mar. 13, 1998, now abandoned, which claims the benefit of Provisional Application No. 60/040,556, filed Mar. 13, 1997.

FIELD OF THE INVENTION

The present invention relates to the sanitizing of perishable food items in enclosed conduits.

BACKGROUND OF THE INVENTION

Ozone has been recognized as safe to use in food processing. Accordingly, food processing equipment suppliers have begun to supply equipment using ozone in washing various foods, for use by food processors. One such equipment supplier is BOC Gases of Murray Hill, N.J. BOC has developed a process (the SafeQuest system) which utilizes ozone in the treatment of poultry. In this system, a chilled bath is filled with ozonated water and poultry carcasses are immersed therein and transferred by conveyor means through ozonated water. The technology is based on a process called the Macron loop. A pump moves water from the chiller bath through a filter. The filtered ozonated water is then titrated with ozone gas, effectively killing any pathogens, such as E. coli 0157:H7 and salmonella and oxidizes any residual organic materials before being recycled through the process, thus saving on waste water treatment costs.

A Con Agra Company poultry processing plant also uses ozone to enable the recycling of process wash water. Once the water has been used, the water passes through a series of ozone vessels. Ozone gas is pumped into the vessels to kill any microorganisms. The system strips out any residual ozone prior to returning it to a chiller. Any residual ozone is captured and run through a catalytic destruction unit. This provides for conserving up to about 80% of recycle water, thus saving the company water, energy and waste water treatment costs.

However, the present methods for using ozonated water to wash food products are for the most part conducted in open vats or in ambient environments wherein, the amount of ozone exposure is relatively uncontrolled.

Ozonated water remains a viable method of sanitizing meat or any other perishable good. However, widespread use of ozone has been hampered by the inability to properly control the amount of ozone exposure to the meat. Ozone is a strong oxidizer and will render perishable goods, such as meat, unsuitable for consumption if the exposure time to ozone is not properly controlled.

Therefore, methods and apparatus for treating meat with ozone are in need of development. The present invention fulfills these needs.

SUMMARY OF THE INVENTION

One aspect of the invention is a method for sanitizing perishable goods by mixing the goods with sanitizing fluid for a suitable period of time followed by separating the fluid and substantially neutralizing any sanitizing fluid left over in the goods.

The invention is directed to a method and apparatus for sanitizing perishable goods by mixing the goods with sanitizing fluid for a suitable period of time followed by separating the fluid and substantially neutralizing any residual sanitizing agent left with the goods. In one instance, the sanitizing fluid includes ozone and water, therefore separation of the ozonated water advantageously can proceed under a squeezing effect to more adequately remove the ozonated water from the goods. Alternatively excess fluid may be separated from goods by use of an enclosed centrifugal apparatus integrated into the sanitizing system. Following neutralization, the goods may further be treated with an antioxidant to reduce the deleterious oxidizing effects of ozone on the beef.

In another aspect of the present invention, a sanitizing apparatus for goods includes a chamber section with a mixing portion and a separating portion. The mixing portion uses paddles disposed on a rotating shaft, and the separating portion uses closer spaced paddles or a spiral screw with increasing cylinder diameter to separate a sanitizing fluid from the goods. Any number of similar chamber sections can be connected together to process goods such as beef with differing fluids, such as neutralizing fluids or antioxidants.

The present invention can thus provide precise control of exposure time to minimized ozone concentration, thus sanitizing the beef without causing deleterious effects on beef. A further advantage is the ability to keep the meat enclosed within a conduit and thus reduce exposure to oxygen.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
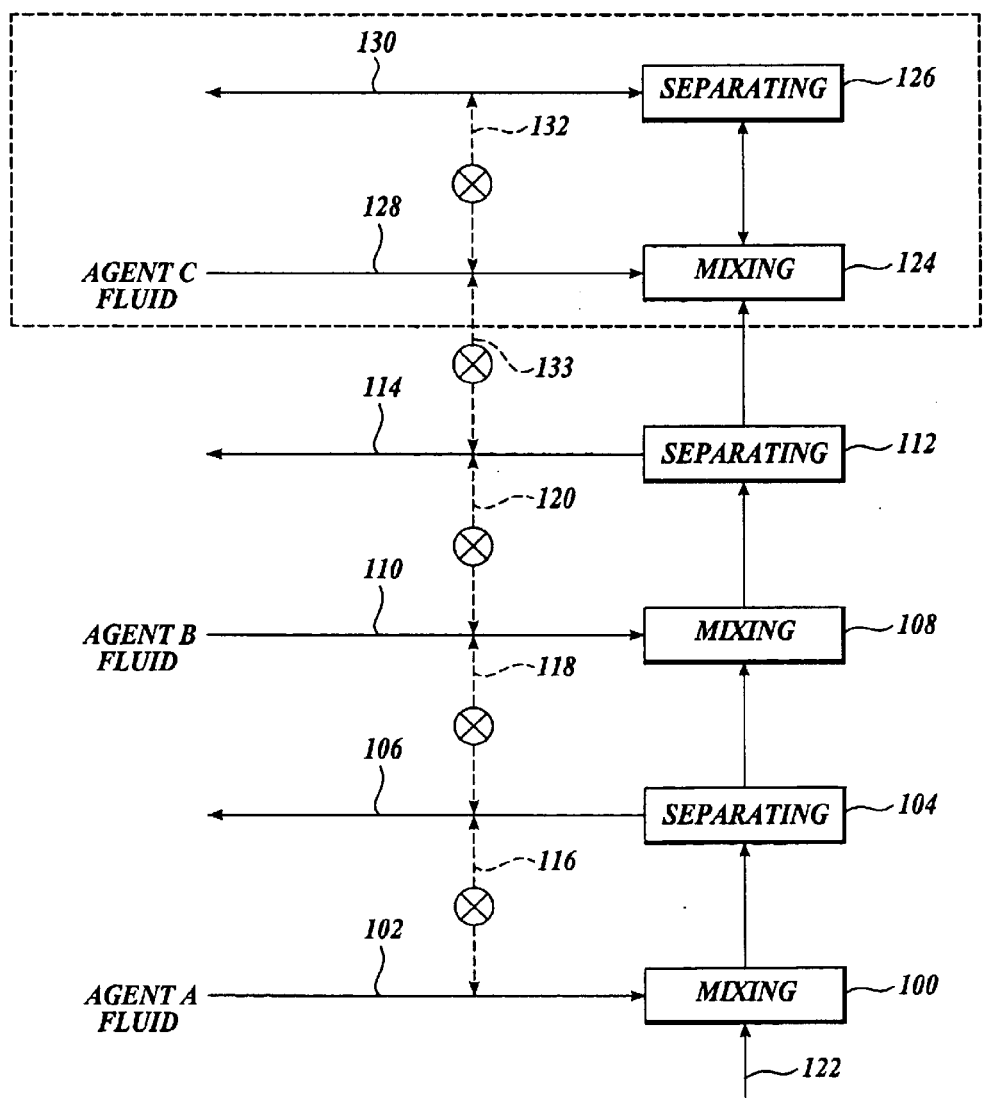
FIG. 1 shows a flow sheet illustration of a method according to the present invention.

The aforementioned PCT application PCT/US01/45146, filed Nov. 28, 2001, attorney docket No. CRSL-1-18064, is herein expressly incorporated by reference. Referring now to FIG. 1, a method for sanitizing perishable goods, including beef, is illustrated. As used in the present invention, sanitizer refers to an agent which will reduce pathogens and microorganisms to insignificant levels. In one instance, this may include the standard set forth in AOAC 4.020–4.029 (1984). Those chemicals which, at recommended concentration, produce 99.999% kill of 75–125 million $E.$ $coli$ (ATCC 1129) and 75–125 million $S.$ $aureus$ (ATCC 6538) within 30 seconds at 70–75° F. are considered satisfactory for purpose of using them in the present invention and can be called sanitizers. However, it is to appreciated that as standards change, the sanitizer used in the present invention, can likewise change accordingly. Furthermore, it is to be appreciated that the method and apparatus may not meet the level of sanitizing as per the definition above. In fact, with food items, it may not be likely that such a high kill rate would be achieved. The present invention provides a substantial reduction of the bacteria population in goods, therefore as used herein "sanitizing" refers to a substantial reduction of the bacteria population, as well as include the kill ratio described.

In one particular embodiment, a method for sanitizing perishable goods includes one or a series of mixing blocks, for mixing a food item, such as boneless beef, with a sanitizing agent. The method also includes blocks for separating the spent agent from the food item. Any number of mixing and separating blocks can be "stacked" atop one another to create a series of processing stages. Furthermore, should the present invention be used with an oxidizing agent, any number of antioxidant mixing blocks can also be incorporated into the system. Furthermore, a mixing block and a separating block can be accomplished within a unitary chamber section of an apparatus conduit. Referring to FIG. 1, a first mixing block 100, a first separating block 104, a second mixing block 108, a second separating block 112, a third mixing block 124 and a third separating block 126, with influent 102, 110 and 128, and effluent 106, 114 and 130 lines having lines 116, 118, 120, 133 and 132 with valves connecting the influent and effluent lines to provide transfer of fluids in any manner indicated by direction arrows on lines 116, 118, 120, 133 and 130, are illustrated. However, it should be readily appreciated that more or less mixing blocks or more or less separating blocks or any other number of similar blocks may be included in the practice of the present invention. It is also to be realized that first mixing block 100 and first separating block 104 can form a separate embodiment of the invention.

Referring still to FIG. 1, a perishable goods stream 122 enters mixing block 100, wherein a sanitizing fluid 102 containing a sanitizing agent, such as ozone, is likewise charged into the mixing block 100. As used herein, fluid is meant to signify any liquid, gaseous, solid/liquid, solid/gaseous, or liquid/gaseous phase of a medium or any combination thereof. Mixing block 100 includes means for performing the mixing of the perishable goods with the sanitizing fluid. One suitable mixing chamber section will be described below. Additionally, jets of fluid may be incorporated in the mixing chamber and in such a manner that the sanitizing fluid can be directed at the beef therein, under considerable pressure, so as to ensure that all surfaces, whether readily exposed or in slots, cracks, slits, crevices that often occur in beef pieces, are suitably exposed to the sanitizing fluid. From the mixing block 100, the perishable good 122 is transferred to a separating block 104. It should be readily appreciated that, in practice, the mixing block 100 and the separating block 104 can be incorporated within a single apparatus as will be further described below. Separating block 104 includes a means for separating the spent sanitizing fluid 106 from the perishable good 122. In one particular embodiment, the fluid 106 leaving the separating block 104 is suitably controlled to be approximately the same as the amount of fluid 102 entering the mixing block 100. This is important under some circumstances which require the amount of fluid, retained with the perishable goods (beef) to be no more than a certain regulated quantity. In still other aspects, the removal of fluid may also take into account any loss due to evaporation or otherwise and provide compensation therefor. Fluid stream 106 leaving separating block 104 can be recycled as stream 116 into the incoming fluid stream 102 or can be included as part of a neutralizing stream 110 as will be described below.

Referring again to FIG. 1, in one particular embodiment, separating block 104 is followed by a second mixing block 108. Second mixing block 108 receives perishable goods 122 from the first mixing block 100 and the first separating block 104. Second mixing block 108 includes a means for mixing a perishable good with a second fluid, such as a neutralizing fluid 110. This is useful, if for example, the sanitizing fluid 102 includes ozone, and the neutralizing fluid 110 includes chloride dioxide. The neutralizing effects of chlorine dioxide with ozone have been described in the referenced PCT application, and they will not be repeated here. Neutralizing fluid 110 may include part of the separated spent sanitizing fluid 106 from separating block 104 via line 118. From second mixing block 108, perishable good 122 is transferred to a second separating block 112. It should be readily appreciated that mixing block 108 and separating block 112 can be incorporated into a single apparatus. Second separating block 112 includes a means for separating spent neutralizing fluid 114 from perishable good 122. In one particular embodiment, the spent neutralizing fluid 114 may be diverted to incoming neutralizing fluid stream 110 via line 120.

Referring still to FIG. 1, in one particular embodiment a third mixing block 124 and a third separating block 126 can follow the second separating block 112. This is useful if for example an antioxidant is to be introduced to mix with and contact surfaces of the perishable good. Suitable antioxidants, and their effects have been described in the aforementioned PCT application and will not be repeated here. Third mixing block 124 receives perishable good 122 from the second separating block 112. Third mixing block 124 is also charged with a third antioxidizing fluid 128 into the mixing block 124. Mixing block 124 includes a means for mixing perishable good 122 with fluid 128. Mixing block 124 is followed by a third separating block 126 for separating the spent antioxidant fluid 130 from the perishable good 122. The spent antioxidant fluid 130 can be recycled to the incoming fresh antioxidant fluid 128 via line 132.

While the method of the present invention has been referenced to a series of three mixing blocks followed by three separation blocks, it should be appreciated that the present invention can be practiced with any number of mixing and separating blocks, which may be more or less than that shown. The number represented here being merely illustrative of one example.

Figure 2:
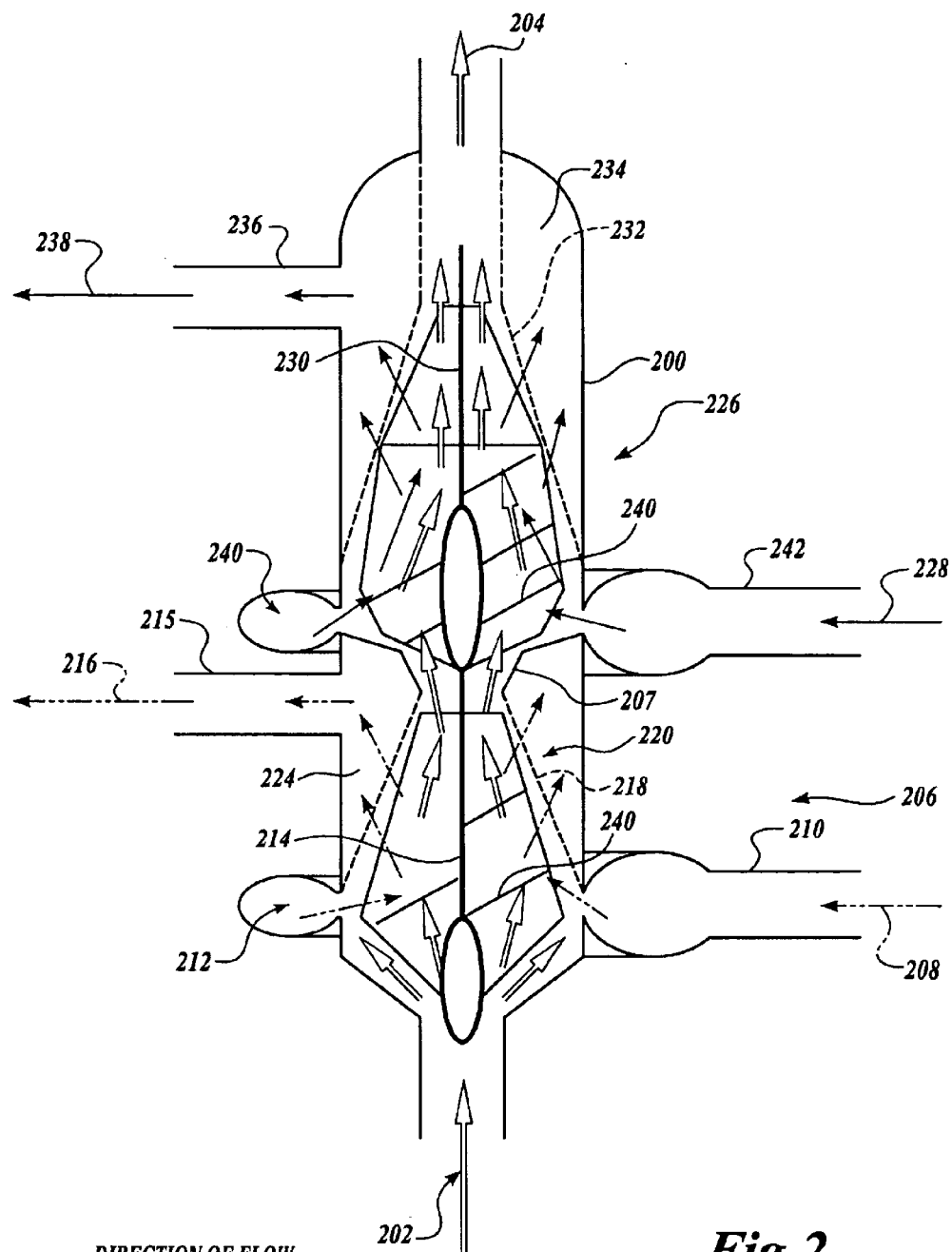
FIG. 2 shows a schematic illustration of one embodiment of an apparatus constructed according to the present invention.

Referring now to FIG. 2, one particular embodiment of an apparatus for carrying out the present invention is illustrated. The apparatus includes an enclosed, vertically disposed conduit or pressure vessel 200 into which boneless beef 202 can be pumped at a selected velocity or mass flow rate at a lower entry point thereof. After processing with any suitable sanitizing fluid and neutralizing fluid, the beef is pumped out of the vessel via an exit port 204.

Referring more specifically to the individual chamber sections of the apparatus, the first chamber section 206 of the apparatus may be devoted to mixing the incoming boneless beef 202 with any suitable sanitizing fluid 208 and separating the spent sanitizing fluid from the beef. The chamber sections of the invention, thus include a mixing portion and a separating portion. In one particular embodiment, the fluid 208 includes ozonated water, including a mixture of ozone and water which is introduced into the sanitizing fluid entry port 210. The entry port 210 can be arranged as a slot 212 provided about the circumference of a lower section of the mixing portion of the chamber section 206.

Referring still to FIG. 2, the interior of the section 206 includes a rotating shaft 214 with means for mixing the boneless beef 202 with the ozonated water 208, wherein the mixing means are provided in the form of a plurality of outwardly extending radial impellors fixed to the central rotating shaft 214. In one particular embodiment, the profile of the mixing section tapers from entry to exit so as to provide for forward movement of the beef as well as mix the beef with the fluid 208. One particular aspect of the invention is to provide for the separation of spent or reacted sanitizing fluid from the beef 202 and discharge the spent fluid 216 through an exit port 215. In one particular embodiment, paddles fixed to the rotating shaft 214 are spaced closer together the further the boneless beef travels through the mixing chamber section 206. In this manner, as the boneless beef approaches the separating portion, the closer spacing of the paddles acts to compress the beef and squeeze the sanitizing fluid through perforations 218 of an interior wall 220 of the apparatus. Perforations 218 provided on the interior wall 220 of the separating portion of the apparatus empties into a space 224 enclosed by the apparatus exterior wall. Thus, interior wall 220 with perforations separates the beef processing space from a substantially beef free space 224. Small amounts of beef blood and "crumbs" may pass through certain of the perforations. Perforations 218 may be provided around the entire circumference of the interior wall 220 of the separating portion. The space 224 is thusly connected to the spent fluid exit 215 through which spent sanitizing fluid 216 is discharged. A transition portion 207 connects the first 206 and second sections 226, and transfers beef 202 therethrough. Transition portions similarly include a screw or otherwise to transfer the beef from section to section.

In one particular embodiment, the apparatus according to the invention also includes a second chamber section 226 for mixing any suitable neutralizing fluid 228 with the perishable good 202 to, in one instance, substantially rid the good 202 of any residual oxidizing agent, (or, in some instances, allow a measured amount to remain) if used in the sanitizing fluid 208. The second neutralizing chamber section 226 is similar in operation to the first chamber section 206 and includes a rotating shaft 230 centrally disposed in the chamber. In one embodiment, shaft 230 can be connected to the rotating shaft 214 of the first mixing chamber section 206, or shafts 230 and 214 can be independently controlled via independent variable speed drivers. Beef or any other perishable item 202 is transferred into the second chamber portion 226 from the first chamber portion 206 by any suitable means. In one particular embodiment, means for transferring boneless beef from the first chamber 206 into the second chamber 226 includes a helical screw similarly attached to shaft 214 or shaft 230 at the transition section between the first and the second chamber sections 206 and 226. The second chamber section 226 similarly includes an annular slot 240 about the circumference of the second chamber 226 for the introduction of the neutralizing fluid 228.

The second chamber portion 226 similarly includes means for mixing the neutralizing fluid with the good 202, via paddles fixed onto the shaft 230 with the paddles being closer spaced to one another the nearer they are to the fluid separating portion of the chamber 226. The second chamber 226 includes an interior wall 232 with perforations. The interior wall 232 thus separates the beef processing space from a substantially beef free space 234, which is in turn connected to the exit port 236 for discharging the spent neutralizing fluid 238.

In a further embodiment, the first and second chamber portions can be controlled at a first lower and higher pressure, respectively. Without limitation a first suitable pressure at the first chamber section 206 can be about 44 psi or less, while the second pressure at the second section 226 operates at increased pressures. In one instance, the second pressure at section 226 being about 60 psi but it can be arranged at any selected pressure greater than the pressure of the first chamber section 206.

Figure 3:
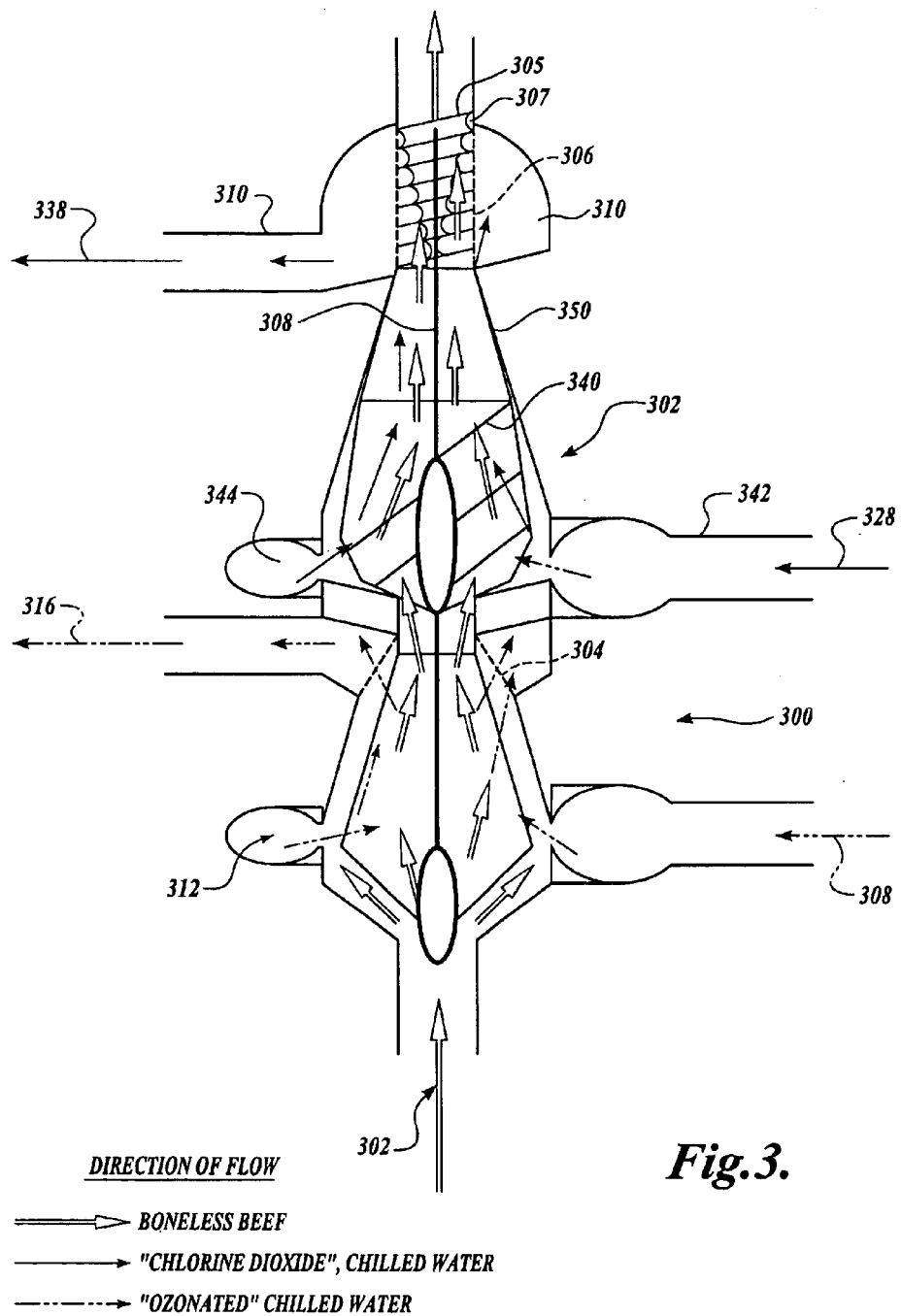
FIG. 3 shows a schematic illustration of a second embodiment of an apparatus constructed according to the present invention.

Referring now to FIG. 3, a second embodiment of an apparatus for carrying out the present invention is illustrated. This embodiment is similar in operation to the previous embodiment of FIG. 1, having a first and second section 300 and 302 with mixing and separating portions for a sanitizing fluid and a neutralizing fluid. In this particular embodiment, the two chamber sections 300 and 302 include a cone shaped exterior wall, effectively reducing the portion allocated for separation via perforations 304 in the section 300. In the case of the second chamber section 302, the perforations are located at a portion of the chamber section 302 that includes an interior wall 306 of substantially constant dimension. The interior wall 306 is located downstream of the mixing portion of section 302. In one aspect, therefore, to compress the beef and separate the spent fluid, the rotating shaft 308 within interior wall 306 can be fitted with a helical spiral screw 305, such that the diameter of the screw cylinder 307 to which are attached the spiral edges of the screw, increase with the forward progress of the beef. In this manner, the beef is compressed, the spent fluid is separated and allowed to flow through perforations 306 and into a space 310 that connects with the spent fluid exit 310.

Figure 4:
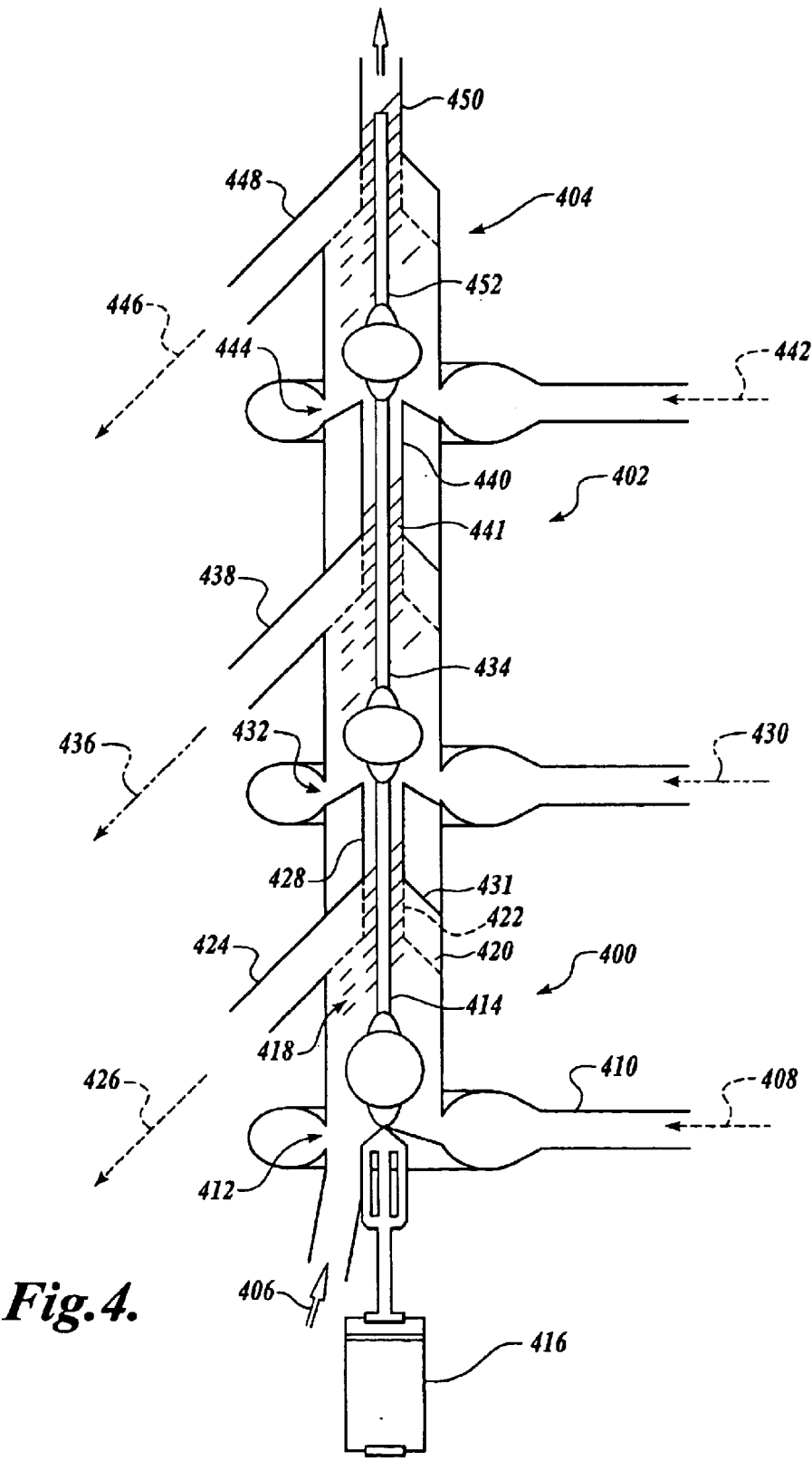
FIG. 4 shows a schematic illustration of a third embodiment of an apparatus constructed according to the present invention.

Referring now to FIG. 4, an apparatus for carrying out the present invention is illustrated. The present invention includes any number of chamber sections having a mixing and a separating portion. In one embodiment, the sections are connected in a continuous fashion, so as to produce a continuous and enclosed conduit, thereby reducing the exposure of boneless beef to oxygen, for example. The enclosed conduit includes an inlet for boneless beef and an outlet for the boneless beef. The chamber sections are of cylindrical construction of constant diameter, but can be configured as cones, as illustrated in FIG. 3 of the previous embodiment.

Each chamber section has an inlet port and an outlet port for any suitable fluid, which will be described in detail below. The outlet fluid port is generally located downstream from the inlet fluid port. Each chamber section can mix the boneless beef with a decontaminating fluid, a neutralizing fluid, or an antioxidant as desired. To this end, each chamber section has a rotating shaft. The shafts can be connected to one another so as to form a single speed shaft for all chamber sections or the shafts can configured so as to rotate independently. A variable drive is connected to the shafts, either independently or as a combined unit. Each shaft within a chamber section has means for mixing the boneless beef with each of the respective fluids. The mixing suitably enables contact of beef surfaces with the respective fluid. In one embodiment "paddles" can be attached on the shafts to provide mixing and forward transfer of the boneless beef through the chambers and to the separating portion of the chambers. Each chamber has means for separating the fluid from the beef. In one embodiment, this can include a section on the shaft with closer spaced paddles, and a convergent interior wall with perforations to enable compression and thus separation of the fluid from the beef. In another embodiment, a helical screw is provided on the shaft. The helical screw can have an increasing cylinder diameter so the beef is compressed between the screw and a perforated interior wall as the beef simultaneously travels forward. The chamber sections include an internal perforated portion adjacent the section where squeezing is in effect. The perforations lead to a space which eventually empties into the fluid exit ports. The chamber sections are equipped with means to convey the boneless beef from one chamber section into the next and adjoining chamber section. Suitable means include any auger or other rotating screw conveyor. While several examples for mixing, separating or transferring have been provided, it is to be appreciated that the invention is not limited thereby to those enumerated, and thus can include any rotating means or otherwise which can mix, transfer, and cause separation of fluids from beef.

Referring to FIG. 4, an embodiment of an apparatus with three chamber sections constructed according to the present invention is illustrated. In this particular embodiment, the three adjacent sections for mixing and separating boneless beef from particular fluids can be provided within a continuous and enclosed conduit. A first section 400 of the apparatus includes means for mixing boneless beef with a sanitizing agent and means for separating the sanitizing agent from the beef. A second upper processing station is located adjacent and immediately above the first lower processing section and is connected directly thereto via a vertically disposed connection. Boneless beef having been transferred through the first, lower processing section directly into the second processing section is then mixed with a second neutralizing fluid, such as a solution of chlorine dioxide of any suitable concentration.

The second section 402 of the apparatus includes means for mixing boneless beef with a neutralizing agent and means for separating the neutralizing agent from the beef. The second, upper processing section 402 is similar in operation to the first processing section 400, meaning that it includes a mixing and separating portion, and after processing the boneless beef so as to neutralize any further residual ozone that may be present on the boneless beef, transfers the beef to a third section 404. Boneless beef having been transferred through the first and second lower processing sections is then mixed with a third antioxidant fluid at the third section 404. The third section 404 of the apparatus includes means for mixing boneless beef with an antioxidant agent and means for separating the antioxidant agent from the beef. The third, upper processing section 404 is similar to the first processing section 400 and second processing section 402 in operation, meaning it includes a mixing and separating portion. The third section 404 of the apparatus includes means for mixing boneless beef with a antioxidant agent and means for separating the antioxidant agent from the beef. The boneless beef is then transferred into a subsequent processing step, such as grinding. Each section can thus include a entry and an exit port for a fluid or agent wherein the entries or exits can be circumferential slots, mixing means in the form of paddles, separating means in the form of closer spaced paddles and/or a spiral screw of increasing cylinder diameter, but constant overall diameter, coupled with a perforated wall.

Referring to FIG. 4, the boneless beef enters the conduit in the direction of the arrow indicated by reference numeral 406. The sanitizing fluid 408 enters via the entry port 410. A slot 412 can be provided around the circumference of the vessel to introduce the sanitizing agent 408 at all points around the vessel. The conduit is equipped with a rotating shaft 414 to which means for mixing and/or compressing the boneless beef are attached thereto. The interior shaft 414 is connected to a variable speed drive 416 to control the speed and rate of processing of the boneless beef. In one particular aspect, paddles 418 are attached to the rotating shaft 414 at a mixing portion to mix surfaces of the boneless beef with the sanitizing agent so as to ensure that substantially all surfaces are exposed and contacted by the fluid. In one instance, the paddles may be closer spaced to each other as the paddles are nearer to the separating portion of the chamber 400. The separating portion of the chamber section 400 includes an interior wall 420 having perforations, wherein the perforations lead to a space. The wall 420 separates the beef processing space from a substantially beef free space that connects to a discharge port. The separating portion of section 400 can extend to an interior conduit 422 of constant dimension and also having perforations. The perforations allow spent fluid to pass from the beef space into a segregated substantially beef free space connected to an exit port 424, where the spent fluid 426 is discharged. In part of the separating portion where the constant diameter conduit 422 is located, the shaft 414 can be fitted with a spiral screw of increasing cylinder dimension so as to compress the beef passing therethrough against the perforations and thusly squeeze out the sanitizing fluid from the beef and also inhibit ingress of fluid from the adjacent section. The narrower interior conduit 428 may continue without perforations into the next section 402 thusly acting as a transition portion between sections 400 and 402 and transferring beef from section 400 to section 402. A dividing interior wall divides the section 400 with the section 402 at the separating portion. The section of conduit 428 feeds boneless beef to section 402, wherein it is mixed with a neutralizing fluid 430. Similarly, the neutralizing fluid 430 can be introduced into an annular slot 432 provided about the circumference of the vessel. The shaft 434 of the second section 402 can be continuous with the first shaft 414 or it can be independently driven. The rotating shaft 434 of the second section contains paddles and or spiral screws (augers), depending on whether mixing or separating is taking place at the appropriate portion of the shaft 434. Similarly, a separating portion is formed at the section 402 to separate the spent neutralizing fluid 436 from the beef. The separated fluid 436 exits from port 438. A transfer section 440, without perforations, is provided at the interface of the section 402 with section 404, and includes a screw as described above for transferring beef from one processing section into the next.

Referring still to FIG. 4, at a third section 404, an antioxidant agent 442 is introduced into an annular slot 444. Similarly, a rotating shaft 452 is fitted with paddles and/or spiral screws at appropriate mixing and separating portions respectively. The separated, spent antioxidant fluid 446 is discharged at exit port 448. The third section 404 includes a transfer conduit 450 with a screw to transfer the beef for further processing.

Figure 5:
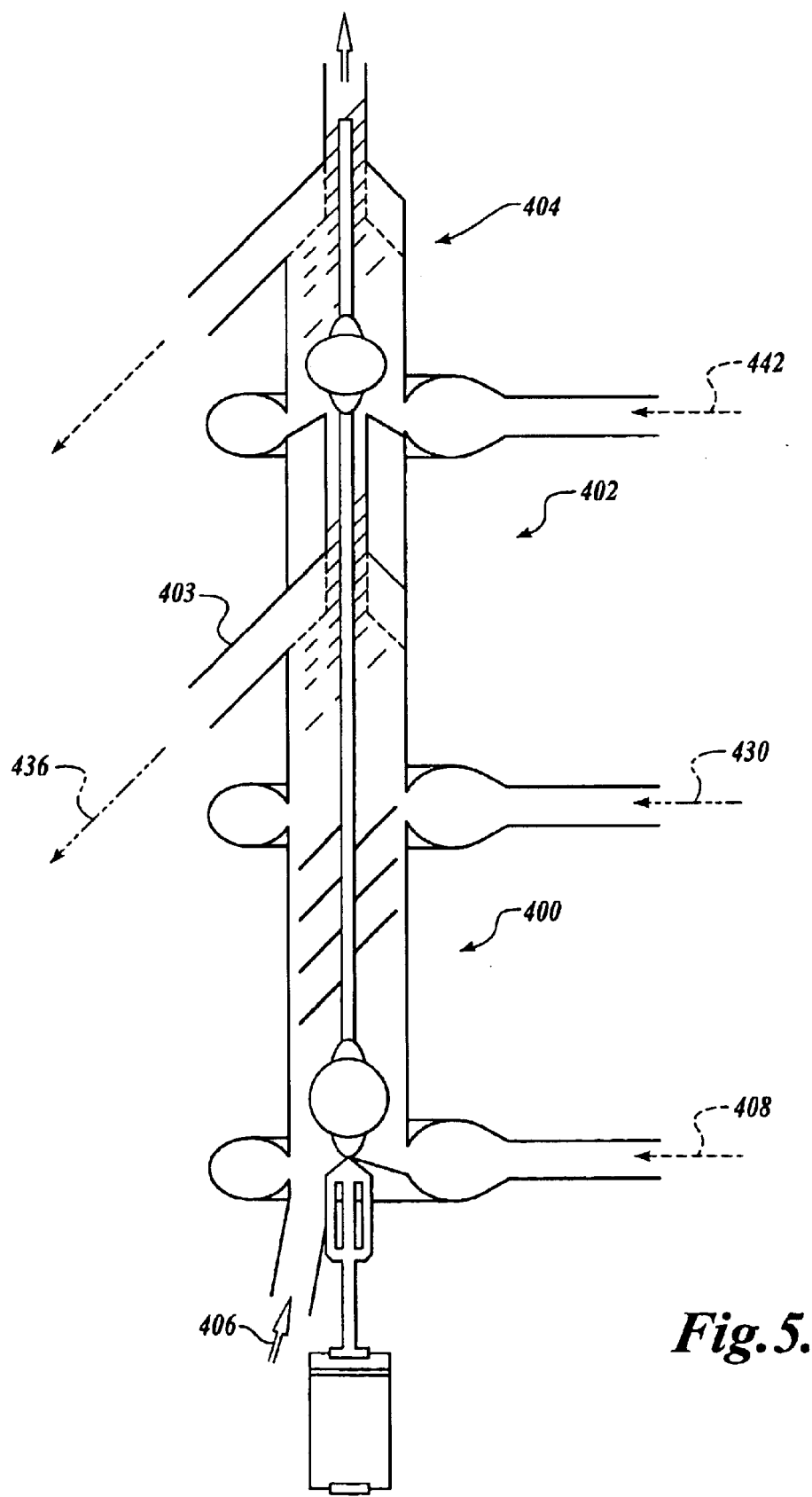
FIG. 5 shows a schematic illustration of a fourth embodiment of an apparatus constructed according to the present invention.

Referring now to FIG. 5, another embodiment of the present apparatus is illustrated. This embodiment is similar in some respects to the embodiment of FIG. 4, with modifications herein described. The embodiment of FIG. 5 has eliminated the transfer auger between section 400 and section 402, thus the separation of the spent sanitizing fluid and the neutralizing fluid are both taken at the second section 402, and the combined spent sanitizing and neutralizing fluids 408 and 430 are discharged together at exit port 403. The section 400 continues to include means for mixing the beef with the sanitizing agent 408.

Figure 6:
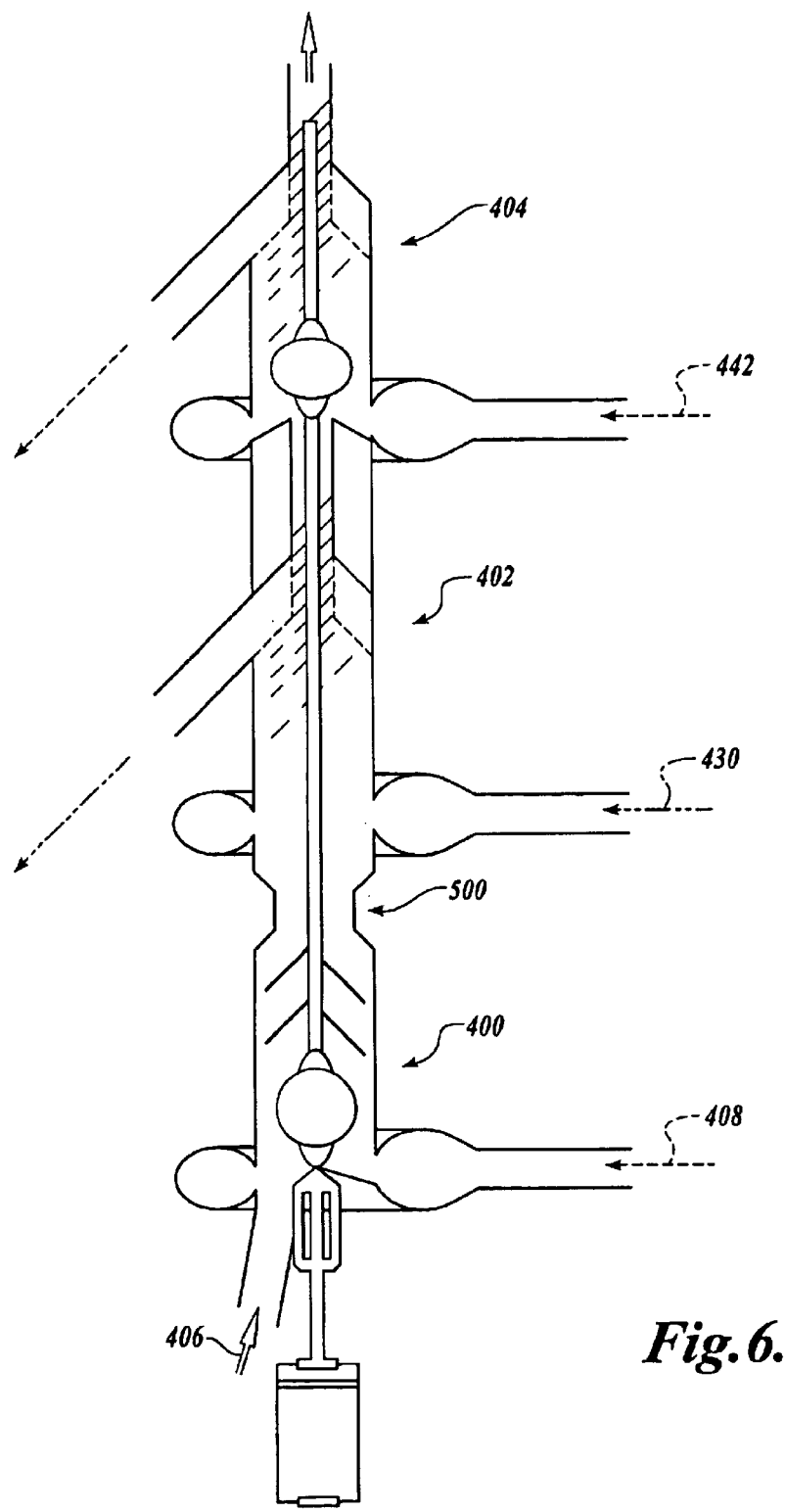
FIG. 6 shows a schematic illustration of a sixth embodiment of an apparatus constructed according to the present invention.

Referring now to FIG. 6, another embodiment of the present apparatus is illustrated. In this particular embodiment, the apparatus is similar in some respects to the embodiment of FIG. 5, with modifications herein described. The embodiment of FIG. 6 includes a constriction 500 located between the first processing section 400 and the second processing station 402. The constriction 500 can be arranged to provide a distinct mixing zone for fluid 408 and beef 406, but also allows free flow of beef 406 into a zone in section 402 where fluid 430 is added to neutralize any residual sanitizing fluid 408 remaining on beef Section 400 continues to include means for mixing beef with sanitizing fluid 408.

In yet another alternate of FIG. 6, the exit port 424 can be included to allow removal of spent fluid 426 below the constriction 500, but still allow transfer of beef through constriction 500 with some amount of fluid 408.

Referring again to FIG. 4, the first selected sanitizing fluid 408 may be any suitable bactericide, such as a mixture of ozone and water. The fluid 408 is pumped into the first section 400 at a selected rate and in such a manner so as to clearly contact substantially all surfaces of the boneless beef 406. The quantities and velocity of the boneless beef 406 and the first fluid 408 transferred into the first section 400 are independently varied according to any factors such as bacterial loading on the boneless beef surfaces. For example, the quantity of the first fluid 408 may be proportionately several times or alternatively less than that of the boneless beef transferred into and out of the first section 400 on a weight basis. In one instance, the apparatus of the invention can process up to 20,000 lbs/min. However, this is not intended to limit the invention, the rate of 20,000 lbs/min being merely one example of the present invention. Ozonated water is provided by mixing an ozone containing stream of up to 16% ozone with a stream of water. The ozone stream may include nitrogen, air, or any gas thereof mixed with ozone. The mixture is then injected or bubbled into the water to achieve the desired ozone concentration. Without limitation, for an ozone stream concentration of 16% or less, the flowrate of the fluid 408 can be about one-half to five times that of the flowrate of the beef. However, the flowrate can be any proportion in between. However, other flowrates below and beyond that described herein can be used to practice the present invention. The range herein described being merely an example of one embodiment. Sometimes, the flowrate of ozonated water can be less than one-half of the beef flowrate and the flowrate of ozonated water can be more than five times the rate of the beef flowrate. The optimum flowrate depends on many variables, including the ultimate concentration of the ozonated water and the bacteria loading. The bacteria loading may be experimentally determined. In one particular embodiment, the sanitizing agent 408 can include hydrogen peroxide. Further sanitizing agents are described in the aforementioned PCT application.

The concentration of the ozone in the sanitizing fluid 408 can be selected and maintained at any chosen level according to, for example, the level of boneless beef surface bacteria loading. However, in some instances, the amount of ozone present in the first fluid 408 will be minimized and arranged to kill bacteria and other undesirable organisms present on the boneless beef, but minimize any other deleterious effects. One such effect could be, for example, the oxidizing of beef fat contained in the boneless beef which may otherwise cause rancidity to occur to such an extent that the boneless beef would be unsuitable for human consumption. To this end, the neutralization of ozone is desirably achieved in the section 402. Neutralizing fluid 430 can include a solution of chlorine dioxide ($ClO_2$) or a mild solution of hydrochloric and/or hypoclorous acids or any combination thereof. Further, neutralizing agents are disclosed in the aforementioned PCT application. Further to the end of minimizing the deleterious effects of a strong oxidizing agent, such as ozone, the antioxidant agent 442 in the third section 404 can be a solution of citrus and/or citric acids or esters. Further antioxidants are disclosed in the aforementioned PCT application.

It is therefore one aspect of the present invention to minimize the exposure of boneless beef to ozone to within a selected and controlled period of time such as five seconds or less, or perhaps as much as thirty seconds or more. However, the time of exposure can also lie from 5 to 30 seconds. The optimum being determined experimentally. The present invention thus provides precise control of ozone exposure by diminishing the oxidizing effects after a controlled time period by no less than separation methods, neutralization methods, and additionally or alternatively antioxidant methods. The separation methods utilized by the present invention being more effective at separating ozonated water from the food item, since the ozone is in essence squeezed out from minute pockets and crevices in the beef. This is followed by neutralizing the ozone in quick succession following the ozone treatment, and thereafter an antioxidant provides still further protection against the deleterious effects of ozone.

After treatment by antioxidants, the beef can be transferred into a vessel in which the beef is retained for a period of time such as less than five minutes to about thirty minutes. The beef may be treated with carbon dioxide in this vessel to ensure removal of substantially all oxygen created as by-products of the ozonated water. The beef is then transferred from the storage vessel and passed through a water washing treatment which can use a processing section similar to any of the processing sections described above so as to substantially remove part or all of the antioxidant used, such as citrus acid. The beef can be processed in a centrifuge to maintain a precise amount of added water (for example, 1.5% or about 3%, depending upon previous or subsequent dehydration). The beef can then be transferred directly into an enclosed gas filled grinding and/or packaging system as disclosed in the aforementioned PCT application.

In a further aspect of the present invention, the amount of exposure to any oxygen may be reduced by introducing a suitable gas, such as one including carbon dioxide, into one or more of the representative processing sections of any embodiment herein described, such as sections 400, 402 or 404 of FIGS. 4, 5, 6 or sections 206, 226, 300 and 302 of FIGS. 2 and 3.

Any other suitable substances may be added to control pH of the beef before, after or concurrently with processing, including grinding, to any desired level. In one instance, the pH can, most preferably, be about 5.3 to about 6.2. However, any other suitable pH range is acceptable in the practice of the present invention. Suitable processing for pH is disclosed in the aforementioned PCT application.

In a still further aspect of the present invention, the temperature of the beef can be controlled to within a suitable range, such as 30 to 40° F. in any one of the aforementioned chamber sections. However, the present invention may be practiced at any temperature above or below the given range. The range described herein being merely one example of a particular embodiment. To this end, the chamber sections of any of the aforementioned apparatus embodiments can include suitable refrigeration systems, jacketed systems, electrical tracing systems, and additionally or alternatively use solid carbon dioxide/water mixtures aimed at controlling the temperature of the beef. Stepwise temperature changes from one processing section to the next may also be practiced according to the invention.

In a further aspect of the invention, any one of the aforementioned apparatus can readily be designed so as to allow opening of the apparatus for automated robot sanitizing. Such design may include, but not be limited to, split-casings, for example.

One aspect of the present invention provides a process to substantially kill and/or injure substantially all pathogens that may be present on the beef with selected agents and then allow citrus acid, which is a powerful antioxidant, to minimize any deleterious effect of oxidation such as can be caused by ozone. Any pathogens that are injured by the ozone and/or chlorine dioxide will be, most likely, killed by exposure to citrus/or citric acid and carbon dioxide with little to no oxygen present. The decontaminating agent, the neutralizing agent, and the antioxidants can be supplied by BOC.

It should be appreciated that while embodiments have been shown containing a single sanitizing chamber section, a neutralizing chamber section, and an antioxidant chamber section, the present invention can be practiced with multiple sanitizing chamber sections, multiple neutralizing chamber sections, and multiple antioxidant chamber sections as well as with only a single sanitizing chamber section or a single sanitizing chamber section with a neutralizing chamber section or a sanitizing chamber section with a neutralizing chamber section followed by a second sanitizing chamber section and a second neutralizing chamber section. Any number of antioxidant chambers can likewise be placed so as to follow the neutralizing chambers. Any combination and type of chamber sections herein described can be used in the practice of the present invention.

While the preferred embodiment of the invention has been illustrated and described, it will be appreciated that various changes can be made therein without departing from the spirit and scope of the invention.

What is claimed is:

1. A vessel comprising apparatus for separating goods from an agent, the apparatus comprising:
   a vertically disposed conduit with an inlet and outlet for goods, and an inlet and outlet for a sanitizing agent, wherein a rotating tapered screw conveyor within the conduit transfers the goods through the conduit, the inlet for the agent is above the tapered screw conveyor and the outlet for the agent is below the tapered screw conveyor.

2. The apparatus of claim 1, wherein the rotating screw conveyor causes the removal of the sanitizing agent from the conduit by compressing the goods and directing the sanitizing agent through a perforated interior wall of the conduit.

3. A vessel comprising apparatus for separating goods from carbon dioxide, the apparatus comprising:
   a vertically disposed conduit with an inlet and outlet for goods, and an inlet and outlet for carbon dioxide, wherein a rotating tapered screw conveyor section within the conduit transfers the goods through the conduit, and wherein the outlet for carbon dioxide is below the tapered screw conveyor section and the inlet for carbon dioxide is above the tapered screw conveyor section.

4. A vessel comprising apparatus for separating fluids from solids, the apparatus comprising:
   (a) a first vertically disposed screw conveyor section within an enclosed conduit, wherein the first screw conveyor section has an inlet in communication with the vessel and an outlet to a second screw conveyor section inlet;
   (b) a second vertically disposed tapered screw conveyor section above the first screw conveyor section within an enclosed conduit having an outlet for solids, an outlet for fluids below the second screw conveyor section, and an inlet for solids and fluids in communication with the outlet from the first screw conveyor section; and
   (c) an inlet for a fluid above the second screw conveyor section in communication with the second screw conveyor section solids outlet.

5. The apparatus of claim 2, wherein the apparatus includes paddles disposed on a rotating shaft, wherein paddles are spaced progressively closer to one another to separate the sanitizing agent from the goods by compressing the goods.

6. The apparatus of claim 5, wherein the apparatus includes a screw of increasing cylinder diameter for separating the sanitizing agent from the conduit through a perforated interior wall of the conduit.

7. The apparatus of claim 6, further comprising means for mixing the goods with a neutralizing agent and means for separating the agent from the goods.

8. The apparatus of claim 7, further comprising paddles disposed on a rotating shaft, wherein paddles are spaced progressively closer to one another to separate the neutralizing agent from the goods by compressing the goods.

9. The apparatus of claim 8, wherein the apparatus includes a screw of increasing cylinder diameter for separating the neutralizing agent from the conduit through a perforated interior wall of the conduit.

10. The apparatus of claim 7, further comprising means for mixing the goods with an antioxidant agent and means for separating the antioxidant agent from the goods.

11. The apparatus of claim 10, further comprising paddles disposed on a rotating shaft, wherein paddles are spaced progressively closer to one another to separate an antioxidant agent from the goods by compressing the goods.

12. The apparatus of claim 11, wherein the apparatus includes a screw of increasing cylinder diameter for separating the antioxidant agent from the conduit through a perforated interior wall of the conduit.

13. The apparatus of claim 7, further comprising a constriction in the conduit.

14. A vessel comprising apparatus for mixing goods with an agent and separating goods from an agent, the apparatus comprising:

a mixing section for mixing goods with an agent; and a vertically disposed conduit with an inlet and outlet for goods and an inlet and outlet for an agent, wherein the conduit comprises a first screw conveyor section within the conduit to compress the goods while transferring the goods through the conduit, and a second tapered screw conveyor section above the first screw conveyor section, the inlet for an agent is above the tapered screw conveyor section and the outlet for an agent is below the tapered screw conveyor section.

* * * * *

UNITED STATES PATENT AND TRADEMARK OFFICE
CERTIFICATE OF CORRECTION

PATENT NO. : 6,866,832 B2
DATED : March 15, 2005
INVENTOR(S) : A.J.M. Garwood

It is certified that error appears in the above-identified patent and that said Letters Patent is hereby corrected as shown below:

Title page,
Item [*] Notice, "128 days." should read -- 240 days. --.
Item [63], Related U.S. Application Data, "continuation-in-part of application No. 09/039,150," should read -- continuation of application No. 09/039,150, --.

Signed and Sealed this

Sixteenth Day of August, 2005

JON W. DUDAS
*Director of the United States Patent and Trademark Office*